United States Patent [19]

Figwer et al.

[11] 4,440,345

[45] Apr. 3, 1984

[54] SPRINKLER

[75] Inventors: Eduard Figwer, Vienna; Franz Schmitzberger, St. Pölten, both of Austria

[73] Assignee: Oesterreichische Salen-Kunststoffwerk Gesellschaft m.b.H., Kaiserstrasse, Austria

[21] Appl. No.: 179,483

[22] Filed: Aug. 19, 1980

[30] Foreign Application Priority Data

Aug. 30, 1979 [AT] Austria .................. 5790/79

[51] Int. Cl.³ .............................................. B05B 3/02
[52] U.S. Cl. ................................. 239/214; 239/214.13
[58] Field of Search ............. 239/214, 214.13, 214.19, 239/214.21, 231, 223, 225, 230, 237, 252, 261

[56] References Cited

U.S. PATENT DOCUMENTS 2,473,945  6/1949  Gibson ........................ 239/214.13
2,539,778  1/1951  Grimmeisen ................. 239/214

FOREIGN PATENT DOCUMENTS 1321580  2/1963  France ........................ 239/261

Primary Examiner—James B. Marbert
Attorney, Agent, or Firm—Oblon, Fisher, Spivak, McClelland & Maier

[57] ABSTRACT

A sprinkler for irrigating large areas comprises a stationary bearing member (1) for the spray pipe (12) and also comprises a separate braking device (3). The braking device (3) comprises radial extensions (13), which are non-rotatably connected to the spray pipe (12). The desired braking is effected in that a free rotation of said radial extensions (13) is prevented by a high-viscosity fluid in the braking device (3). The radial extensions (13) which are non-rotatably connected to the spray pipe (12) may interdigitate with radial extensions (10) which are non-rotatably connected to the stationary housing (2) of the braking device (3). As a result, the high-viscosity fluid will be subjected to shear stress between adjacent radial extensions (10, 13), which are non-rotatably connected in alternation to the spray pipe (12) and the housing (2). To improve the braking action, interdigitating axial extensions may be connected to the radial extensions.

12 Claims, 14 Drawing Figures

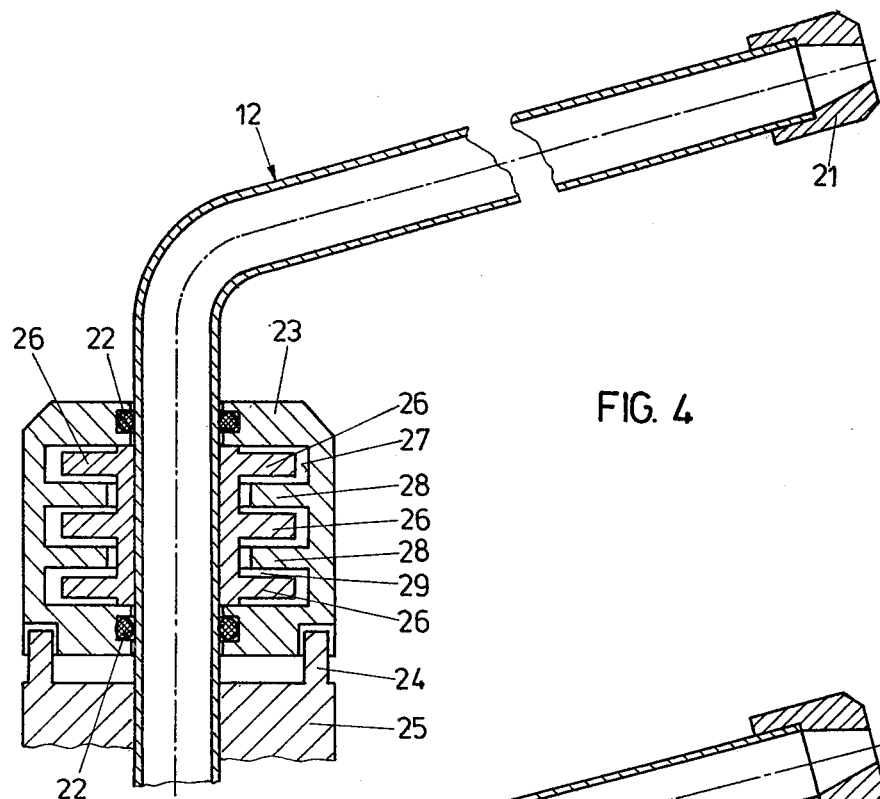
FIG. 4
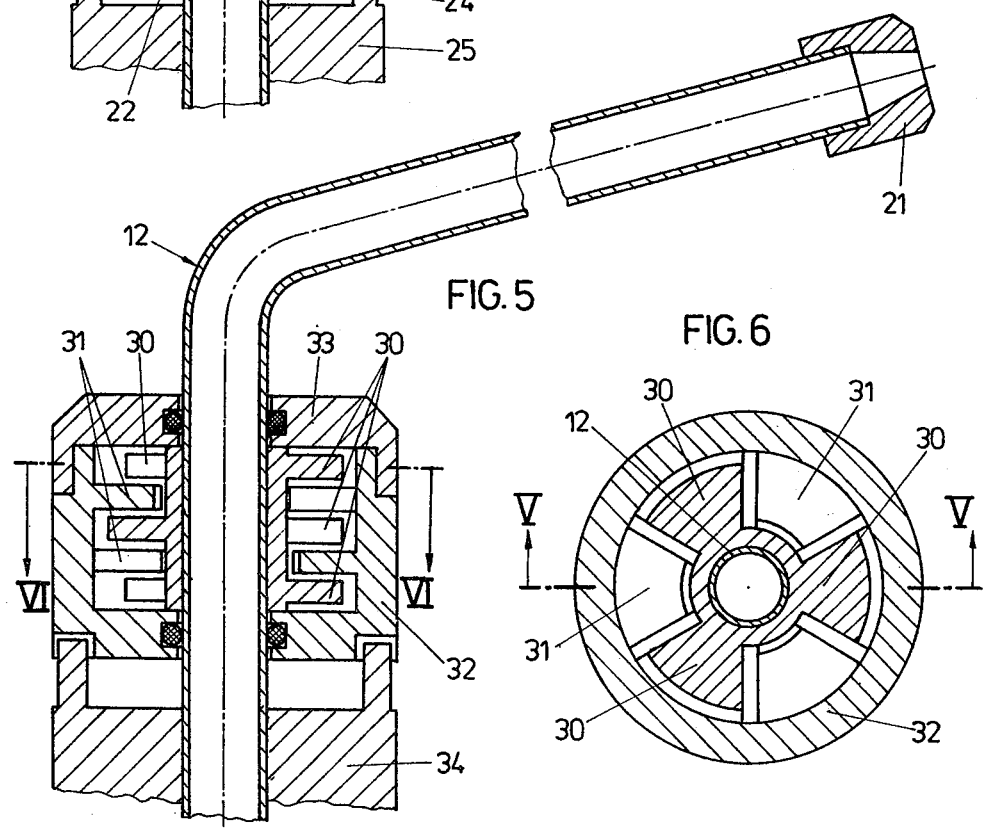
FIG. 5
FIG. 6

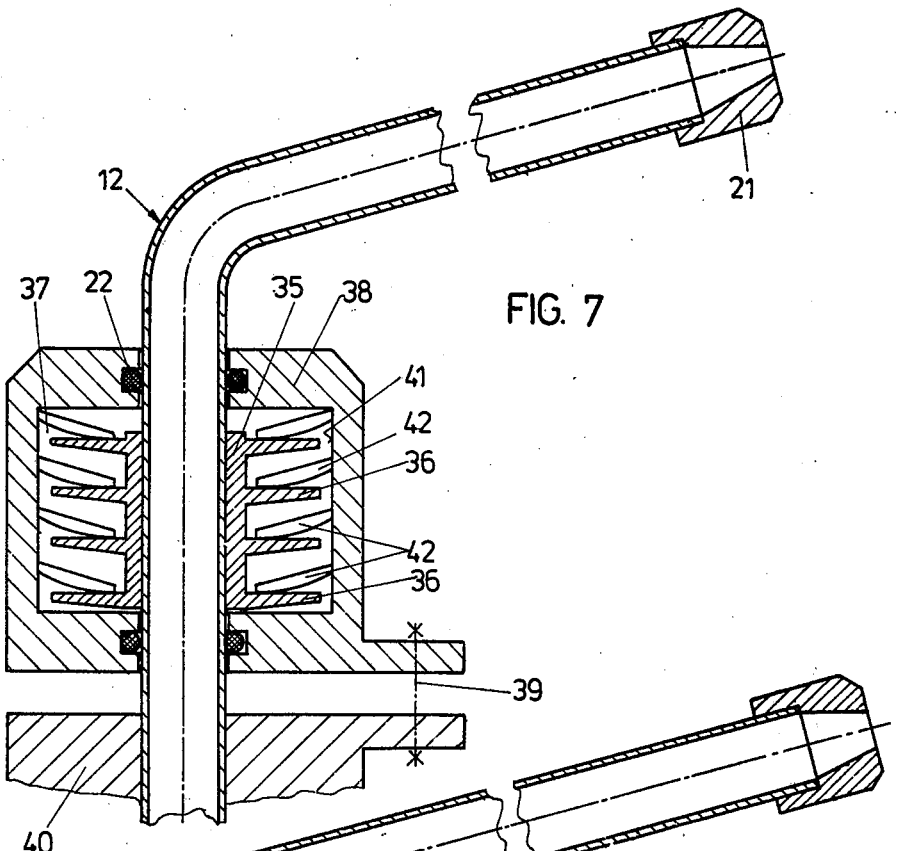
FIG. 7
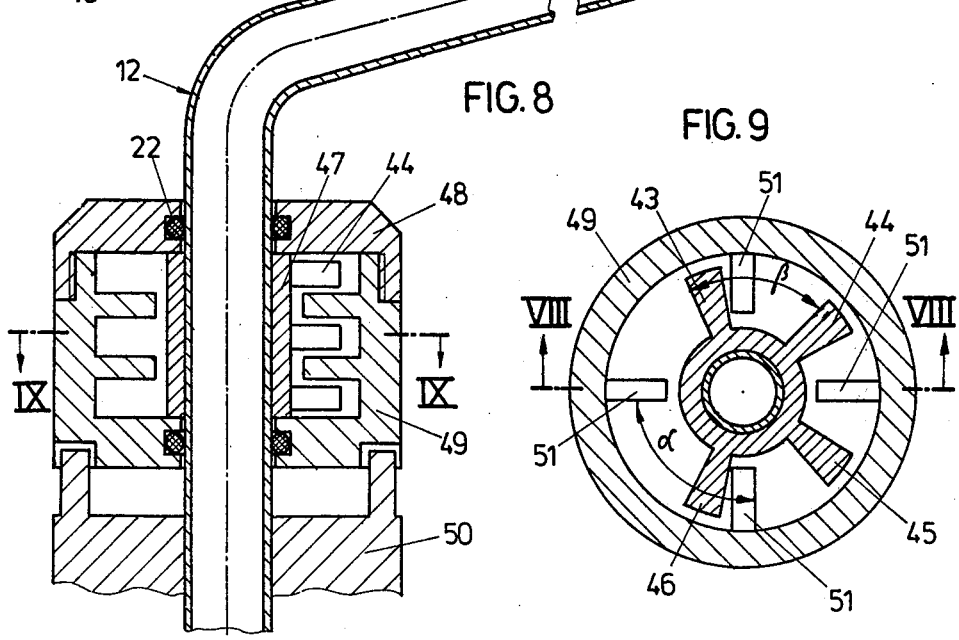
FIG. 8
FIG. 9

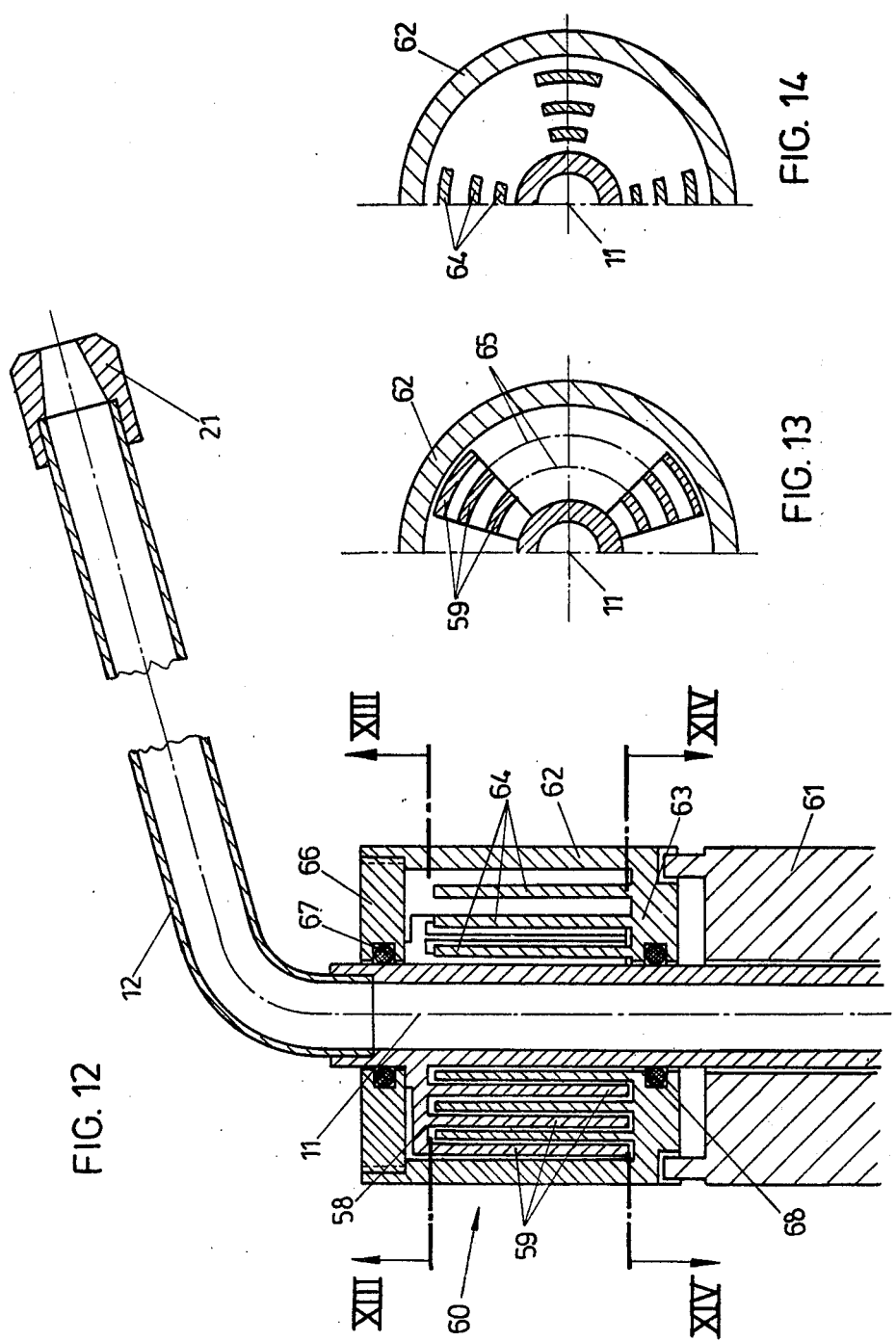

SPRINKLER

This invention relates to a sprinkler comprising a spray pipe, which is rotatably mounted in a stationary bearing member and has at least one outlet nozzle and is adapted to rotate in response to a deflection of the water being discharged, and a braking device, which brakes the rotation of the spray pipe by friction, particularly by the internal friction of a liquid. Sprinklers driven by the reaction force of the water jet being discharged must usually be braked if a sufficiently large throwing range is to be achieved. As a rule, the rotation must be braked to 2 to 5 rotations per minute. It has already been proposed to guide the discharge pipe of the sprinkler of the kind described first herein before in a sliding-surface bearing, which is filled with a high-viscosity oil, which has a viscosity of 50 to 5000 stokes at 20° C. In that known sprinkler, a sliding surface which must be machined at high cost is required and only very small tolerances are permissible for the inside surface of the bearing housing and the outside surface of the discharge pipe in the region in which that pipe is guided in the housing or sliding-surface bearing. In any case, such known sprinkler having the required dimensional accuracy and absence of tolerances can apparently be provided only when metal parts are employed.

It is an object of the invention to provide a sprinkler which is of the kind described above and which is so designed that all parts can be made of plastic material and there is no need for expensive machining operations. This object is accomplished in accordance with the invention essentially in that the pivot bearing for the spray pipe is spaced from the braking device, the braking device comprises a housing which is filled at least in part with a high-viscosity oil or paste and is non-rotatably connected to a stationary member of the pivot bearing, the spray pipe extends through the housing in sealed relation thereto and at least one radial extension is non-rotatably connected to the spray pipe and cooperates with the high-viscosity oil or paste within the housing. Because the bearing is spaced from the device for braking the rotation, the braking device is kept free from mechanical forces, which are taken up by the bearing. The braking device comprises a housing through which the spray pipe extends in sealed relation to the housing, and that housing is filled at least in part with a high-viscosity oil or paste. The housing is non-rotatably connected to a stationary part of the pivot bearing. The rotation of the spray pipe is braked by at least one radial extension, which is non-rotatably connected to the spray pipe and is immersed in said high-viscosity oil or paste within the housing. Compared with a design in which the sliding-surface bearing is filled throughout its axial length with high-viscosity oil the proposed design affords the advantage that the braking device need no longer meet critical tolerances as the radial extension will be capable in any case to subject the high-viscosity oil or paste to a shear stress which is sufficiently high for a braking of the rotation. The high-viscosity oil presents to the radial extension a suitable resistance against a free rotation, and these forces are transmitted to the spray pipe with a mechanical advantage which depends on the radial extent of the extension. Owing to this more favorable mechanical advantage, an effective braking can be effected even by small forces.

The high-viscosity oil or paste may particularly consist of a synthetic oil or paste having rheological properties which can easily be controlled. It is believed that the use of so-called dilatant fluids having a viscosity which increases with the shear stress is particularly desirable. When such fluids are used in a sprinkler according to the invention, only small forces will be required to initiate the rotation of the sprinkler and a substantial stabilization of the speed will be effected as the speed increases. By the use of high-viscosity oil, the braking device according to the invention differs in principle from mechanically prestressed disks of a multipledisk clutch, in which high initial forces are required to overcome the static friction so that the several discs can slip. Besides, such clutches are most liable to be misadjusted.

In a preferred embodiment, the housing has a substantially cylindrical inside surface, which is non-rotatably coupled to at least one radially inwardly directed extension, which is spaced in the axial direction of the spray pipe from the radial extension or extensions which is or are non-rotatably connected to the spray pipe, and a gap is defined between mutually confronting end faces of adjacent extensions which are spaced apart in the axial direction of the spray pipe. Owing to the additional provision of radially inwardly directed extensions on the inside surface of the housing, the high-viscosity oil or paste disposed in the gap between mutually confronting end faces of the extensions will be subjected to a shear stress as said extensions are rotated so that an effective braking will be ensured. To ensure a high efficiency, it will be sufficient to non-rotatably connect the extensions spaced apart in the axial direction of the spray pipe in alternation to the spray pipe and to the housing. The design may simply be such that the extensions disposed in a given radial plane are peripherally spaced and preferably staggered from the extensions disposed in an adjacent, axially spaced apart, radial plane. This arrangement will result in a relatively continuous braking throughout a revolution. The assembling will be particularly simple if the extensions are so arranged in a certain rotational position that the extensions which are non-rotatably connected to the spray pipe are aligned with the spaces between the extensions that are non-rotatably connected to the housing. In that case the spray pipe can simply be inserted into the housing and the seal can be effected, e.g., in that a cover provided with a suitable sealing element for engaging the outside surface of the housing is screwed on the latter. Because the bearing consists of a separate part, the sealing elements of the housing may consist of highly elastic sealing rings which will reliably prevent an ingress of water into the housing and an escape of oil.

To ensure that the rotation and braking will be as uniform as possible throughout a revolution, the central angles between peripherally adjacent extensions disposed in a given radial plane preferably differ from the central angles between the peripherally adjacent extensions disposed in an axially adjacent radial plane. As a result, an extension coupled to the spray tube will always cooperate with an extension coupled to the housing so that a braking action will be effected in any rotational position.

In a particularly simple embodiment the radial extensions consist of annular disks having flat end faces. The design is preferably such that the outside peripheral surface of the rotatably mounted spray pipe or of a member that is non-rotatably connected thereto is provided in part of its area with at least one rib or groove, which extends along a generatrix and interengages with a groove or rib of the annular disk or disks which is or are non-rotatably connected to the spray pipe. In a simple arrangement, the annular disks which are non-rotatably connected to the stationary bearing member can cooperate by means of recesses or projections at the outside peripheral surface of said annular disks with elevations or grooves at the inside surface of the housing. The flat end faces of the annular disks permit a uniform rotational movement. The gap which is provided between these annular disks and extends substantially in a radial plane is filled with the high-viscosity oil or paste. As any forces which tend to compress the annular discs will be taken up by the separate bearing, the high-viscosity oil disposed between the annular disks cannot be squeezed out. It will be sufficient if axially spaced apart annular disks are non-rotatably connected in alternation to the spray pipe and the housing. The braking function will not be adversely affected if such non-rotatable connection has a substantial backlash.

To maintain the desired gap between adjacent end faces, the axial spacing between adjacent annular disks is preferably limited by stops. Compared with the use of annular disks which are spring-biased toward each other, such a limitation by stops affords the advantage that the high-viscosity oil between the annular disks will not be squeezed out by mechanical forces.

In a particularly simple embodiment, the housing is split and the end walls of the housing for the stops for keeping the annular disks axially spaced apart. One part of the split housing may consist of a cover, which can be screwed off. Alternatively, a substantially cylindrical housing may be swung open about a hinge extending along a generatrix of its shell and may be provided on its inside peripheral surface with radially inwardly protruding ribs, which correspond to the annular disks that are non-rotatably connected to the housing, which ribs extend between adjacent annular disks that are non-rotatably connected to the spray pipe.

The housing and the radial extensions or anular disks consist perferably of oil-resisting plastic materials, such as polyacetal.

For a generation of torque, the spray pipe may simply be cranked. Alternately, torque can be generated by a spray pipe which is formed in its shell along a generatrix on one side with one or more outlet openings, or by a baffle which is disposed in the flow path of the water being discharged.

According to a preferred further feature of the sprinkler according to the invention, substantially axially directed, concentrically arranged extensions are connected to the radial extensions and the axial extensions connected to the radial extensions that are non-rotatably connected to the spray pipe are spaced different directions from the axis than any axial extensions connected to radial portions of the stationary part. Such an arrangement can easily be manufactured because can-shaped hollow-cylindrical or axial extensions can easily be removed from the mold. In such an arrangement, axial extensions facing each other constitute a particularly lare friction surface and the axial extensions which are stationary will extend into the spaces between the axial extensions which are non-rotatably connected to the spray pipe. In accordance with a preferred further feature of that design, the axial extensions consist of webs, which extend substantially throughout the axial length of the braking device, and a plurality of webs spaced a given distance from the axis are peripherally spaced apart on the respective enveloping circle. Because the axial extensions consist of webs, the frictional cooperation between confronting webs will be interrupted several times during each revolution as the webs do not constitute a continuous cylindrical surface. Such interrupted frictional braking results in a considerable improvement of the braking action of numerous oils or pastes which can be used as high-viscosity fluids. For instance, silicone oils have thixotropic properties and tend to assume a uniform orientation under a constant shearing load. Such orthoorientation will not be assumed by the high-viscosity fluid when the latter is subjected to an intermittent shear stress. As a result, the braking effect will remain substantially constant with time even where high-viscosity fluids having thixotropic properties are used. The axially extending webs spaced different distances apart extend preferably through the same central angles in the peripheral direction of the respective enveloping circle. In that case the webs which are spaced different distances from the axis will be uniformly loaded owing to the mechanical advantage.

The invention will now be described more fully with reference to the drawings, in which embodiments are shown by way of example and with additional details which are essential for the invention.

In the drawings,

FIG. 4 is a sectional view showing a modification of a sprinkler according to the invention;

FIGS. 5 and 6 show another embodiment, FIG. 5 being a sectional view taken on line V-V in FIG. 6 and FIG. 6 a sectional view taken on line VI-VI in FIG. 5;

FIG. 7 is a sectional view that is similar to FIGS. 1, 4 and 5 and shows a modification;

FIGS. 8 and 9 are sectional views showing another embodiment, FIG. 8 being a sectional view taken one line VIII-VIII of FIG. 9 and FIG. 9 being a sectional view taken on line IX-IX in FIG. 8;

FIGS. 12 to 14 show another embodiment, FIG. 12 being a longitudinal sectional view and;

FIGS. 13 and 14 being sectional views taken on line XIII-XIII and XIV-XIV, respectively.

Figure 1:
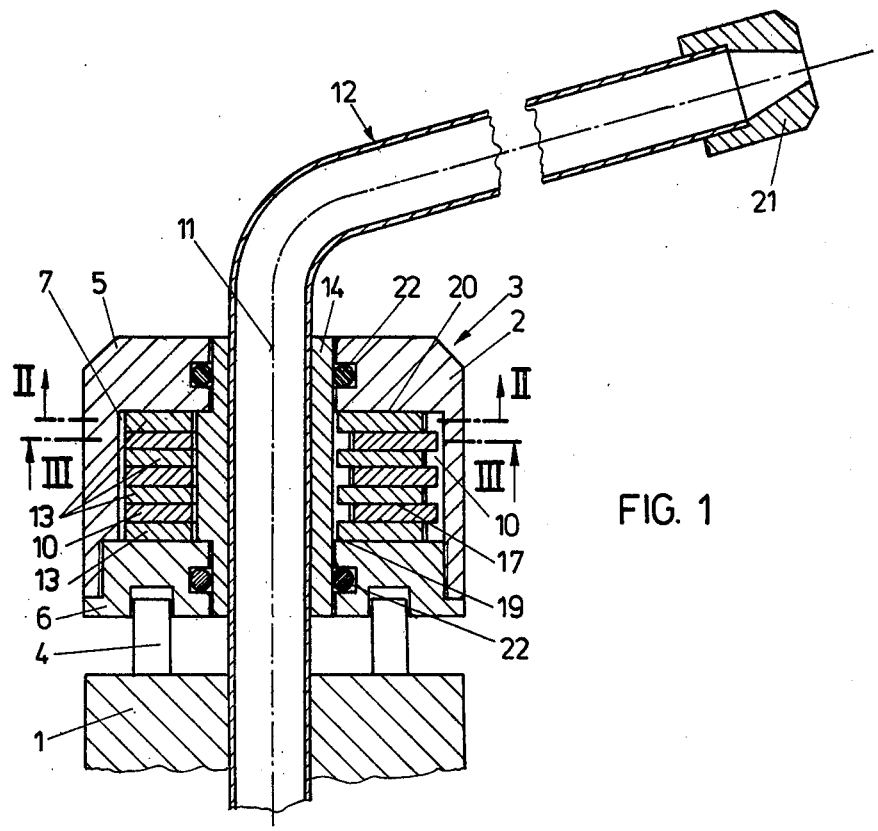
FIG. 1 is a sectional view showing a sprinkler according to the invention.
Figure 2:
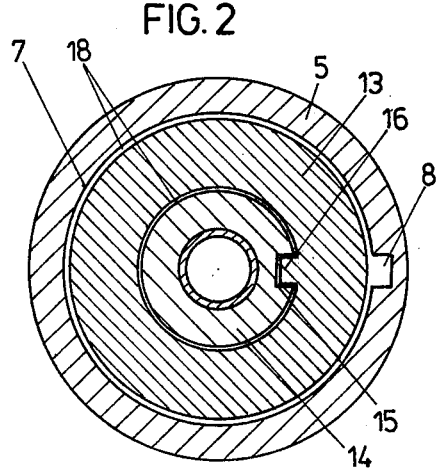
FIG. 2 is a sectional view taken on line II-II in FIG. 1.
Figure 3:
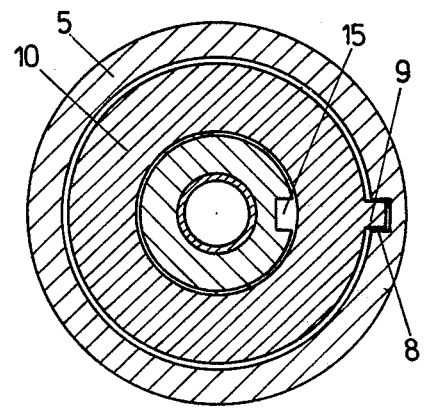
FIG. 3 is a sectional view taken on line III-III in FIG. 1.

FIG. 1 shows a stationary bearing member 1. The housing 2 of the braking device 3 is non-rotatably connected by pins 4 to the stationary bearing member. The housing 2 comprises a cover 5 and a body 6, which is connected by screw threads to the cover and interengages with the pins 4 for establishing a non-rotatable connection. The substantially cylindrical inside surface 7 of the housing cover 5 is formed with a groove 8, which receives extensions 9 of annular disks 10 so that the latter are non-rotatably connected to the inside surface 7 of the housing. Annular disks 13 spaced apart in the direction of the axis 11 of the spray pipe 12 are respectively disposed between adjacent annular disks 10. The annular disks 13 are non-rotatably coupled to the spray pipe 12 in that a bushing 14 rigidly connected to the spray pipe 12 is formed in its outside peripheral surface with a groove 15, which receives inwardly directed projections 16 of the disks 13. The mutually confronting end faces of adjacent annular disks 10 and 13 define gaps 17. These gaps as well as the entire interior cavity 18 of the housing are filled with a high-viscosity oil or paste. The width of the gap is limited by the inside end faces 19 and 20 of the body and cover of the housing, respectively. During a rotation of the spray pipe 12, which is provided with a spray nozzle 21, the annular disks 13 exert shearing forces on the high-viscosity oil or paste in the gaps 17 and owing to the viscosity of the fluid these shearing forces result in a braking of the rotation of the spray pipe 12. The spray pipe 12 is cranked—this is not shown—so that a suitable reaction resulting in a rotation is produced. The bushing 14 is sealed in the housing 3 by sealing rings 22 to prevent an ingress of water and an escape of oil. The details of this embodiment are shown more fully in FIGS. 2 and 3, where the same reference characters have been used as in FIG. 1.

The embodiment shown in FIG. 4 comprises a housing 23, which can be swung open about a hinge extending along a generatrix of the shell of the housing. By means of projections 24 of the stationary bearing member 25, the housing 23 is non-rotatably connected to the bearing. The spray pipe 12 is non-rotatably connected directly to a radial extension consisting of a member which carries annular ribs 26. That member may be keyed to the spray pipe 12 or may be cemented to or shrunk on the outside surface of the spray pipe. The substantially cylindrical inside surface 27 of the housing 23 is provided with radially inwardly directed ribs 28 disposed in planes which are spaced along the axis of the spray pipe 12 so that gaps 29 are defined by cooperating adjacent extensions 26 and 28 and are filled with a high-viscosity oil or paste. Just as in the embodiment shown in FIG. 1, the housing is protected by sealing rings 22 against an ingress of water and an escape of oil.

The embodiment shown in FIGS. 5 and 6 differs from the embodiment shown in FIG. 4 in that three extensions, which are symmetrical with respect to the axis, are provided in each plane. The extensions 30 are non-rotatably connected to the spray pipe 12. The extensions 31 are non-rotatably connected to the body 32 of the housing. In this embodiment just as in the embodiment of FIG. 1, the housing comprises a cover 33 because this embodiment can be assembled in an axial direction if the arrangement shown in FIG. 5 is chosen, in which the extensions 30 non-rotatably connected to the spray pipe can be inserted between the peripheral spaces between the extensions 31 of the housing. The extensions 30 and 31 extending in axially spaced apart radial planes assume different angular positions so that the assembling operation comprises an insertion in an axial direction and a rotation of the extensions 30 which are non-rotatably connected to the spray pipe 12 so that they can be moved past the extensions 31 spaced apart in the axial direction. The body 32 of the housing is again non-rotatably connected to a stationary bearing member 34.

In the embodiment shown in FIG. 7, a member 35 is non-rotatably connected to the spray pipe 12 and provided with radial ribs 36. These radial ribs 36 extend into the interior cavity 37 of a housing 38, which is connected to the bearing member 40 by an eccentric screw 39. Slit resilient ribs 42 are provided on the inside surface 41 of the housing 38 and protrude substantially radially inwardly. During a rotation of the member 35, the ribs 36 subject the high-viscosity fluid in the interior cavity 37 to a shear stress. The high-viscosity fluid cannot co-rotate because it adheres to the cylindrical inside surface 41 of the housing 38. This effect is improved by the resilient projections 42, which are non-rotatably connected to the housing and a slit and define chambers for the high-viscosity fluid so that the latter cannot rotate freely.

In the embodiment shown in FIGS. 8 and 9, the spray pipe 12 is also non-rotatably connected to e.g., shrunk on, a member 47, which carries radial extensions 43, 44, 45 and 46. The housing comprises also a cover 48 and a body 49, which is non-rotatably connected to the stationary bearing member 50. The inside surface of the housing is provided with inwardly protruding extensions 51, which are spaced between the axially spaced apart planes that contain the extensions 43, 44, 45 and 46, respectively. The radial extensions 51 of the housing are regularly spaced apart to define a uniform central angle $\alpha$. The central angle $\beta$ between the extensions 43 and 44 differs from the central angle $\alpha$. In this case, the majority of the extensions non-rotatably connected to the spray pipe 12 ensure that at least one of the extensions 43, 44, 45, 46 registers with at least one extension 51 in a top plan view so that the high-viscosity fluid disposed between the stationary extensions and the extensions that are non-rotatably connected to the spray pipe is subjected to a shear stress.

Figure 10:
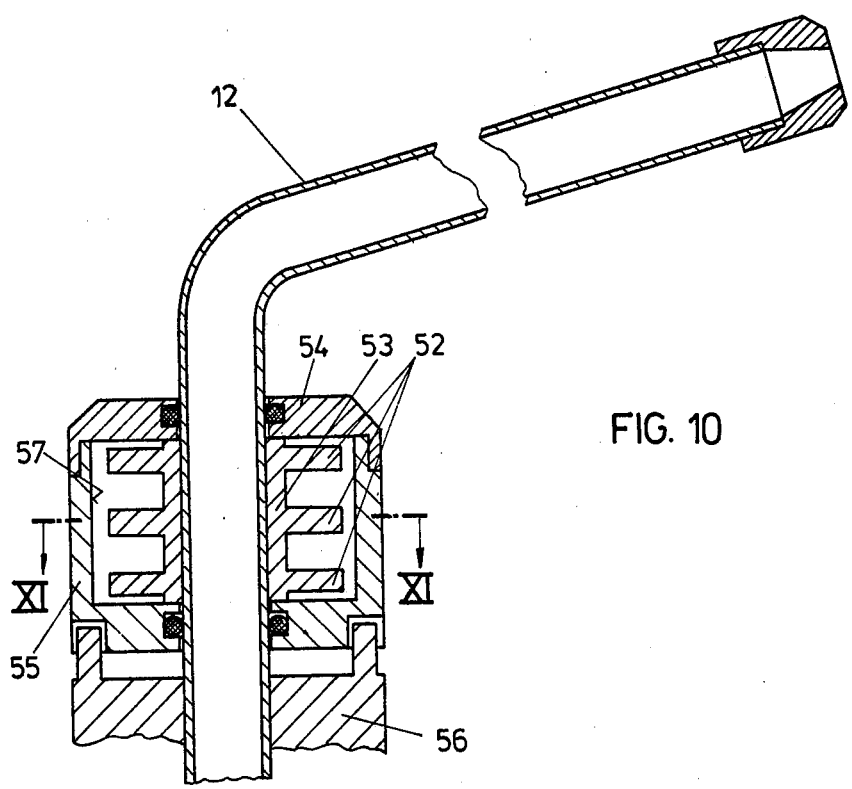
FIGS. 10 and 11 show a further embodiment, FIG. 10 being a longitudinal sectional view and FIG. 11 a sectional view taken on line XI-XI in FIG. 10.
Figure 11:
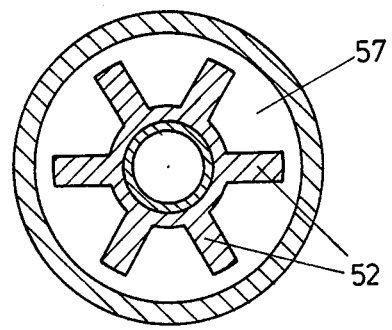

In the embodiment shown in FIGS. 10 and 11, the spray pipe 12 is also non-rotatably connected to, e.g., shrunk on, a member 53 which carries radial extensions 52. The housing has also a cover 54 and a body 55, which is non-rotatably connected to the stationary bearing member 56. The inside surface 57 of the housing is not provided with inwardly protruding extensions. The interior cavity 57 of the housing is filled with a high-viscosity fluid, which is subjected to a shear stress by a rotation of the spray pipe 12 and of the extensions 52 so that the rotation is braked as desired.

Suitable high-viscosity oils or pastes include mainly synthetic oils having a viscosity of 50 to 10,000 stokes, preferably about 2000 to 5000 stokes, at 20° C.

FIGS. 12 to 14 show another embodiment of a sprinkler according to the invention. In this embodiment, a radial extension 58 is non-rotatably connected to the spray pipe 12 and carries web 59, which extend in the direction of the axis 11 substantially throughout the axial length of the braking device 60. A stationary housing member 62 is connected to a bearing bracket 61 and has a radially extending part 63, which carries extensions or webs 64 that extend in the direction of the axis 11. The axial extensions 64 are spaced different distances from the axis 11 than the axial extensions 59 so that the axial extensions 59 and 64 will interdigitate during a rotation of the spray pipe 12. The housing 62 is again filled with a high-viscosity oil or paste. As is apparent from FIGS. 13 and 14, the axial extensions 59 and 64 spaced different distances from the axis 11 extend through the same central angle in the peripheral direction of the respective enveloping circles 65.

The housing of this sprinkler is closed by a cover 66 and is protected by seals 67 and 68 against an ingress of water. Because the friction is effective between substantially axial webs, this embodiment is much less susceptible to an ingress of water than a design having only radially extending extensions.

We claim:

1. A sprinkler comprising:
   a spray pipe having at least one outlet nozzle, said spray pipe being rotatable about an axis in response to the discharge of water from said at least one nozzle;
   a stationary bearing member supporting said spray pipe for rotation of said spray pipe;
   a stationary housing surrounding a portion of said spray pipe in a fluid tight manner so as to define a cavity;
   at least two spaced first radial extensions in said cavity and fixed to said spray pipe; and
   high viscosity fluid at least partially filling said cavity wherein said housing, said at least two radial extensions and said high viscosity fluid together comprise a braking means spaced from said bearing member, wherein said radial extensions are formed of oil resisting plastic materials.

2. The sprinkler of claim 1 wherein said cavity has a cylindrical circumferential surface and including at least one second radial extension fixed to said cylindrical surface and associated with said cavity, said first and second radial extensions being axially spaced to form at least two axial gaps therebetween.

3. The sprinkler of claim 2 wherein each of said first and second extensions is formed as at least two extensions in different radial planes and circumferentially staggered.

4. The sprinkler of claim 2 or 3 wherein said at least two first radial extensions are formed in a single radial plane and are spaced from one another by a first circumferential angle, and wherein at least two of said second extensions are formed in a second radial plane and are spaced from one another by a second circumferential angle different from said first circumferential angle.

5. A sprinkler according to claim 2 wherein said first and second radial extensions consist of annular disks having flat faces.

6. A sprinkler according to claim 5 wherein the axial spacing of the annular disks is limited by stops.

7. The sprinkler of claim 5 wherein said disks are fixed to one of said spray pipe and said housing by mating recesses and projections.

8. A sprinkler according to claim 1 wherein said housing is filled with a synthetic oil having a viscosity of 50 to 10,000 stokes at 20° C.

9. A sprinkler according to claim 2 wherein substantially axially directed, concentrically arranged extensions are connected to said first and second radial extensions and wherein said axial extensions connected to said second radial extensions are spaced at different distances from the axis than any of said first axial extensions.

10. The sprinkler of claim 9 wherein said axial extensions comprise cirucmferentially spaced webs.

11. The sprinkler of claim 10 wherein all of said webs have the same angular width.

12. A sprinkler according to claim 6 wherein said housing is split and the axial end walls of the housing form the stops for keeping the annular disks axially spaced apart.

* * * * *